United States Patent
Huang et al.

(10) Patent No.: US 10,750,132 B2
(45) Date of Patent: Aug. 18, 2020

(54) SYSTEM AND METHOD FOR AUDIO SOURCE LOCALIZATION USING MULTIPLE AUDIO SENSORS

(71) Applicant: Pelco, Inc., Clovis, CA (US)

(72) Inventors: Chien-Min Huang, Clovis, CA (US); Wei Su, Clovis, CA (US); Farzin Aghdasi, Clovis, CA (US); James G. Millar, Clovis, CA (US); Greg M. Millar, Coarsegold, CA (US)

(73) Assignee: PELCO, INC., Fresnon, CA (US)

( * ) Notice: Subject to any disclaimer, the term of this patent is extended or adjusted under 35 U.S.C. 154(b) by 212 days.

(21) Appl. No.: 13/804,629

(22) Filed: Mar. 14, 2013

(65) Prior Publication Data
US 2014/0267704 A1    Sep. 18, 2014

(51) Int. Cl.
*H04N 7/18* (2006.01)
*H04N 5/232* (2006.01)
(Continued)

(52) U.S. Cl.
CPC .......... *H04N 7/188* (2013.01); *G01S 3/8083* (2013.01); *H04N 5/232* (2013.01);
(Continued)

(58) Field of Classification Search
None
See application file for complete search history.

(56) References Cited

U.S. PATENT DOCUMENTS

| | | | | |
|---|---|---|---|---|
| 4,176,922 A | * | 12/1979 | Roth | ...................... G03B 31/00 352/27 |
| 5,051,964 A | * | 9/1991 | Sasaki | .......................... 367/135 |

(Continued)

FOREIGN PATENT DOCUMENTS

| | | | |
|---|---|---|---|
| JP | 2006304124 A | * | 11/2006 |
| JP | 2012150059 A | * | 8/2012 |
| JP | 2012120059 | * | 9/2012 |

OTHER PUBLICATIONS

Yamasaki et al. "Measurement of spatial information in sound fields by closely located four point microphone method" Journal of the Acoustical Society of Japan (E) 1989, vol. 10 No. 2 pp. 101-110.*

(Continued)

*Primary Examiner* — Jayanti K Patel
*Assistant Examiner* — Stefan Gadomski
(74) *Attorney, Agent, or Firm* — Tutunjian & Bitetto, P.C.

(57) ABSTRACT

An automated security surveillance system determines a location of a possible disturbance and adjusts its cameras to record video footage of the disturbance. In one embodiment, a disturbance can be determined by recording audio of the nearby area. A system, coupled to a camera, may include an arrangement of four audio sensors recording audio of the nearby area to produce independent outputs. The system further may include a processing module configured to determine an angle and distance of an audio source relative to a location of the arrangement of the four audio sensors. The system can then adjust the camera by rotation along an azimuth or elevation angle and adjusting the zoom level to record video of the audio source. Through use of the system, a surveillance system can present an image of a source of possible disturbance to an operator more rapidly and precisely than through manual techniques.

21 Claims, 7 Drawing Sheets

(51) Int. Cl.
*H04R 1/40* (2006.01)
*G01S 3/808* (2006.01)
*G08B 13/16* (2006.01)
*G08B 13/196* (2006.01)

(52) U.S. Cl.
CPC ......... *H04N 5/23296* (2013.01); *H04R 1/406* (2013.01); *G08B 13/1672* (2013.01); *G08B 13/19695* (2013.01); *H04R 2201/401* (2013.01); *H04R 2430/21* (2013.01)

(56) References Cited

U.S. PATENT DOCUMENTS

| | | | | |
|---|---|---|---|---|
| 5,715,319 | A * | 2/1998 | Chu | 381/26 |
| 5,808,663 | A * | 9/1998 | Okaya | H04N 7/142 |
| | | | | 348/14.1 |
| 6,198,693 | B1 * | 3/2001 | Marash | G01S 3/8083 |
| | | | | 342/417 |
| 6,593,956 | B1 * | 7/2003 | Potts et al. | 348/14.09 |
| 7,324,664 | B1 * | 1/2008 | Jouppi | G06K 9/00255 |
| | | | | 348/169 |
| 8,169,463 | B2 * | 5/2012 | Enstad | H04N 5/232 |
| | | | | 348/14.08 |
| 8,787,114 | B1 * | 7/2014 | Plotke | G01S 3/8083 |
| | | | | 367/119 |
| 8,983,089 | B1 * | 3/2015 | Chu | H04R 3/005 |
| | | | | 381/58 |
| 2001/0012441 | A1 * | 8/2001 | Lee | H04N 5/9205 |
| | | | | 386/203 |
| 2001/0019516 | A1 * | 9/2001 | Wake | G01S 3/8083 |
| | | | | 367/127 |
| 2002/0181721 | A1 * | 12/2002 | Sugiyama | G01H 3/00 |
| | | | | 381/92 |
| 2003/0231547 | A1 * | 12/2003 | Yang | G01S 3/8083 |
| | | | | 367/11 |
| 2005/0078833 | A1 * | 4/2005 | Hess | G01S 3/8083 |
| | | | | 381/26 |
| 2006/0104458 | A1 * | 5/2006 | Kenoyer | H04N 7/14 |
| | | | | 381/92 |
| 2007/0280051 | A1 * | 12/2007 | Novick | G01S 5/18 |
| | | | | 367/118 |
| 2008/0219099 | A1 * | 9/2008 | Novick | G01S 3/8006 |
| | | | | 367/118 |
| 2008/0273683 | A1 * | 11/2008 | Cohen | H04M 3/56 |
| | | | | 379/202.01 |
| 2009/0002476 | A1 * | 1/2009 | Cutler | 348/14.01 |
| 2009/0015658 | A1 * | 1/2009 | Enstad | H04N 5/232 |
| | | | | 348/14.08 |
| 2009/0175466 | A1 * | 7/2009 | Elko | H04R 3/005 |
| | | | | 381/94.2 |
| 2010/0019715 | A1 * | 1/2010 | Roe | B25J 9/0003 |
| | | | | 318/568.12 |
| 2011/0141853 | A1 * | 6/2011 | Megdal | G01S 3/8083 |
| | | | | 367/117 |
| 2011/0157300 | A1 * | 6/2011 | Solvang | G01S 3/8083 |
| | | | | 348/14.16 |
| 2011/0264249 | A1 * | 10/2011 | Derkx | G01S 3/8083 |
| | | | | 700/94 |
| 2012/0076316 | A1 * | 3/2012 | Zhu | H04R 3/005 |
| | | | | 381/71.11 |
| 2012/0128160 | A1 * | 5/2012 | Kim et al. | 381/17 |
| 2012/0327115 | A1 * | 12/2012 | Chhetri | H04R 3/005 |
| | | | | 345/633 |
| 2013/0058492 | A1 * | 3/2013 | Silzle | H04R 29/002 |
| | | | | 381/59 |
| 2013/0141576 | A1 * | 6/2013 | Lord | G08G 1/04 |
| | | | | 348/148 |
| 2013/0300648 | A1 * | 11/2013 | Kim | G06F 3/011 |
| | | | | 345/156 |
| 2013/0317830 | A1 * | 11/2013 | Visser et al. | 704/500 |
| 2014/0070942 | A1 * | 3/2014 | Haase | G08B 21/02 |
| | | | | 340/532 |
| 2014/0112483 | A1 * | 4/2014 | Etter | H03G 3/3005 |
| | | | | 381/56 |

OTHER PUBLICATIONS

Yong Rui, Liwei He, Anoop Gupta, and Qiong Liu. 2001. Building an intelligent camera management system. In Proceedings of the ninth ACM international conference on Multimedia (Multimedia '01). ACM, New York, NY, USA, 2-11. DOI: https://doi.org/10.1145/500141.50014 (Year: 2001).*

Yiteng Huang, J. Benesty and G. W. Elko, "Passive acoustic source localization for video camera steering," 2000 IEEE International Conference on Acoustics, Speech, and Signal Processing. Proceedings (Cat. No. 00CH37100), Istanbul, Turkey, 2000, pp. II909-II912 vol. 2. doi: 10.1109/ICASSP.2000.859108 (Year: 2000).*

* cited by examiner

SYSTEM AND METHOD FOR AUDIO SOURCE LOCALIZATION USING MULTIPLE AUDIO SENSORS

BACKGROUND OF THE INVENTION

Security systems can employ cameras to secure or monitor a specific area. Some security systems provide manual controls for a user to rotate or zoom cameras to monitor an area. Other security systems have cameras rotate or zoom on a schedule to monitor different locations periodically. Based on the video footage, security personnel can deploy to an area to stop a current threat or disturbance.

SUMMARY OF THE INVENTION

In one embodiment, a system may include an arrangement of at least four audio sensors configured to produce independent outputs. The system further may include a processing module configured to determine an angle and distance of an audio source relative to a location of the arrangement of the at least four audio sensors.

In another embodiment, the processing module may be further configured to orient a camera lens of a camera system to the audio source. The camera system may be operationally coupled to the processing module. The processing module may be further configured to instruct the camera system to cause the camera lens to adjust its zoom to a zoom factor as a function of the distance of the audio source. In another embodiment, the processing module may be further configured to calculate an azimuth angle from the audio source to the arrangement and an elevation angle from the audio source to the arrangement.

In another embodiment, the arrangement of audio sensors may include a central audio sensor and three surrounding audio sensors. Each of the three surrounding audio sensors may be positioned on a respective axis orthogonal to each other axis with an origin located at the central audio sensor. Distances between the audio sensors of the arrangement may be at least one order of magnitude smaller than the distance of the arrangement of audio sensors to the audio source.

In another embodiment, the independent outputs of the at least four audio sources may be audio signals. The arrangement of at least four audio sources may be configured to produce a combined output of the distance of the audio source to the arrangement by correlating the audio signals received at the at least four audio sources.

In another embodiment, method may include producing independent outputs from audio sensors from an arrangement of at least four audio sensors. The method may further include determining an angle and distance of an audio source relative to a location of the arrangement of the at least four audio sensors.

In another embodiment, a non-transitory computer-readable medium can be configured to store instructions for locating an audio source. The instructions, when loaded and executed by a processor, may cause a system coupled to the processor to receive independent outputs from an arrangement of at least four audio sensors. The instructions may further cause the system to determine an angle and distance of an audio source relative to a location of the arrangement of the at least four audio sensors.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

An arrangement of at least four audio sensors can be configured to localize a location of an audio source. The direction of the audio source can be detected with three audio sensors; however, three audio sensors can only narrow the possible directions to two. A fourth sensor can isolate the location of the audio source. Four sensors can correctly identify the location of the audio source, but also the distance from the audio source to the arrangement of audio sensors as well. A video surveillance Pan/Tilt/Zoom (PTZ) camera installed with three audio sensors can be directed to the audio source, but if the audio source is far away from the camera, the camera cannot see the details of what caused the sound. If the distance to the audio source is known, then the camera can be zoomed-in according to the distance detected to see the details of an object or subject producing the audio source within the video.

Figure 1A:
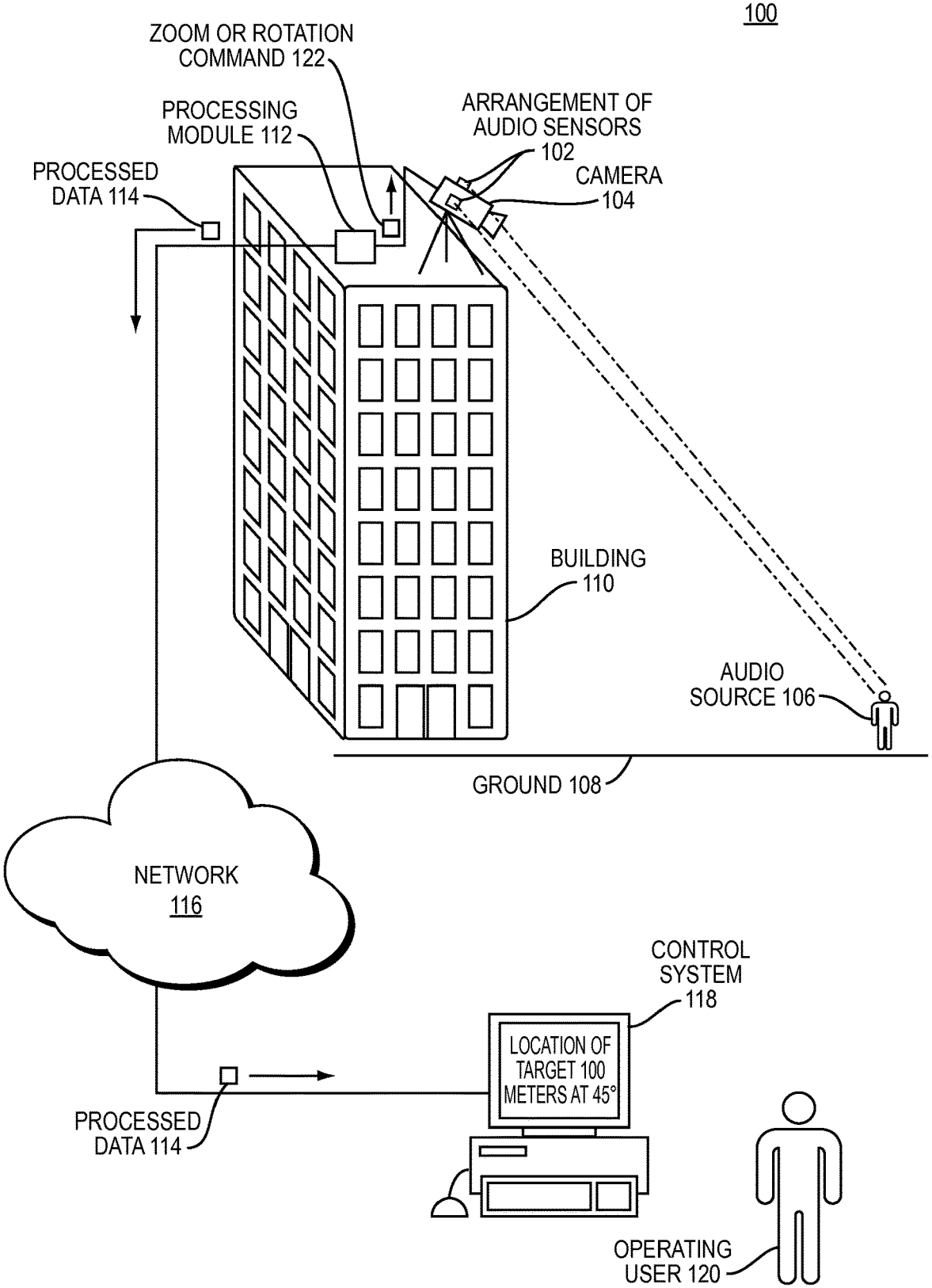
FIG. 1A is a block diagram illustrating an example embodiment of a camera configured with an arrangement of audio sensors and a processing module to determine a location of an audio source and adjust the camera to rotate and zoom to the audio source.

FIG. 1A is a block diagram 100 illustrating an example embodiment of a camera 104 configured with an arrangement of audio sensors 102 and a processing module 112 to determine a location of an audio source 106 and adjust the camera to rotate and zoom to the audio source 106. The camera 104 is generally located at a high location, for example, on top of a building 110. The camera 104 can also be located on top of a pole or fence or connected to a wall. The system is configured to determine the location of the audio source 106 located on the ground 108. A height of the camera 104 relative to the ground 108 is known (e.g., known to the processing module 112 and/control system 118).

The camera 104 can be used for surveillance of areas around the building 110. The camera 104 can, upon hearing audio from the audio source 106, determine the location of the audio source 106, rotate to point at the audio source 106 and zoom and/or focus on audio source 106 to acquire video.

The camera 104 is operatively coupled with the processing module 112, which is configured to receive data from the arrangement of audio sensors 102 of the camera 104 and output processed data 114 that indicates the location of the audio source 106. The processed data 114 can be in the form of an azimuth (and/or pan) angle, an altitude (and/or tilt) angle, and/or the distance to the target. The processing module 112 also outputs a zoom or position command 122 to the camera 104. The zoom or position command 122 can cause the camera 104 to rotate along the azimuth and/or elevation angle and zoom to the audio source 106.

In one embodiment, the processed data 114 is transmitted over a network 116 to a control system 118. An operating user 120 can operate the control system 118 and see the location of the target relative to the camera. In another embodiment, the control system can output the location of the target relative to the building 110. The operating user 120 can then act appropriately by, for example, dispatching security to the location of the audio source 106.

Figure 1B:
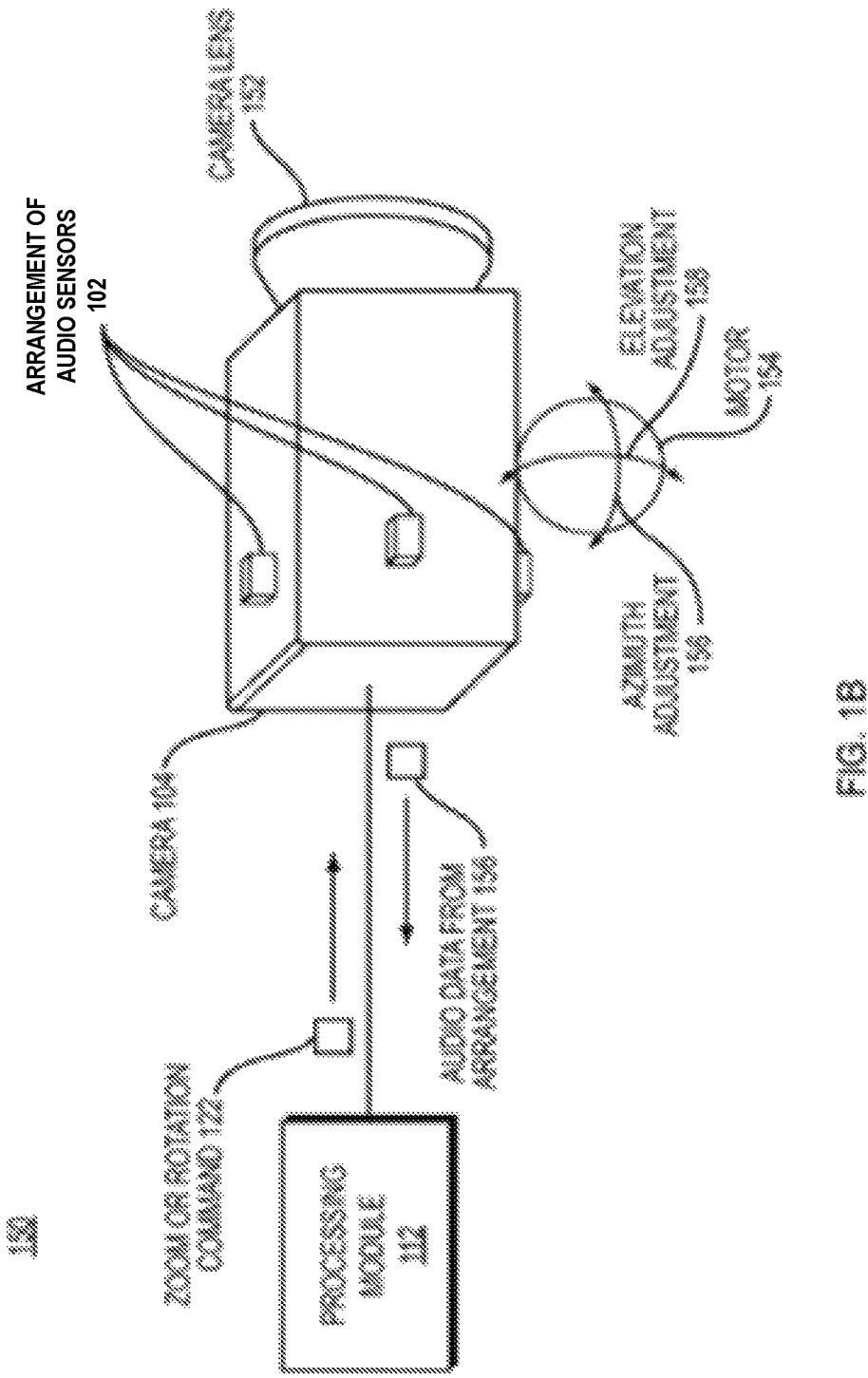
FIG. 1B is a diagram illustrating an example embodiment of the processing module coupled with the camera.

FIG. 1B is a diagram 150 illustrating an example embodiment of the processing module 112 operatively coupled with the camera 104. The camera 104, as in FIG. 1A, includes an arrangement of audio sensors 102. The camera also includes a camera lens 152 and a motor 154. Upon receiving a zoom or position command 122 from the processing module 112, the motor 154 adjusts the camera 104 along an azimuth adjustment 156 and/or an elevation adjustment 158, or both. Further, if the zoom or rotation command 122 is a zoom command, the camera 104 adjusts its camera lens 152 to zoom on the audio source. The camera 104 sends audio data from the arrangement of audio sensors 150 to the processing module 112. The processing module, in response to the audio data 150, sends the zoom or rotation command 122.

Figure 2:
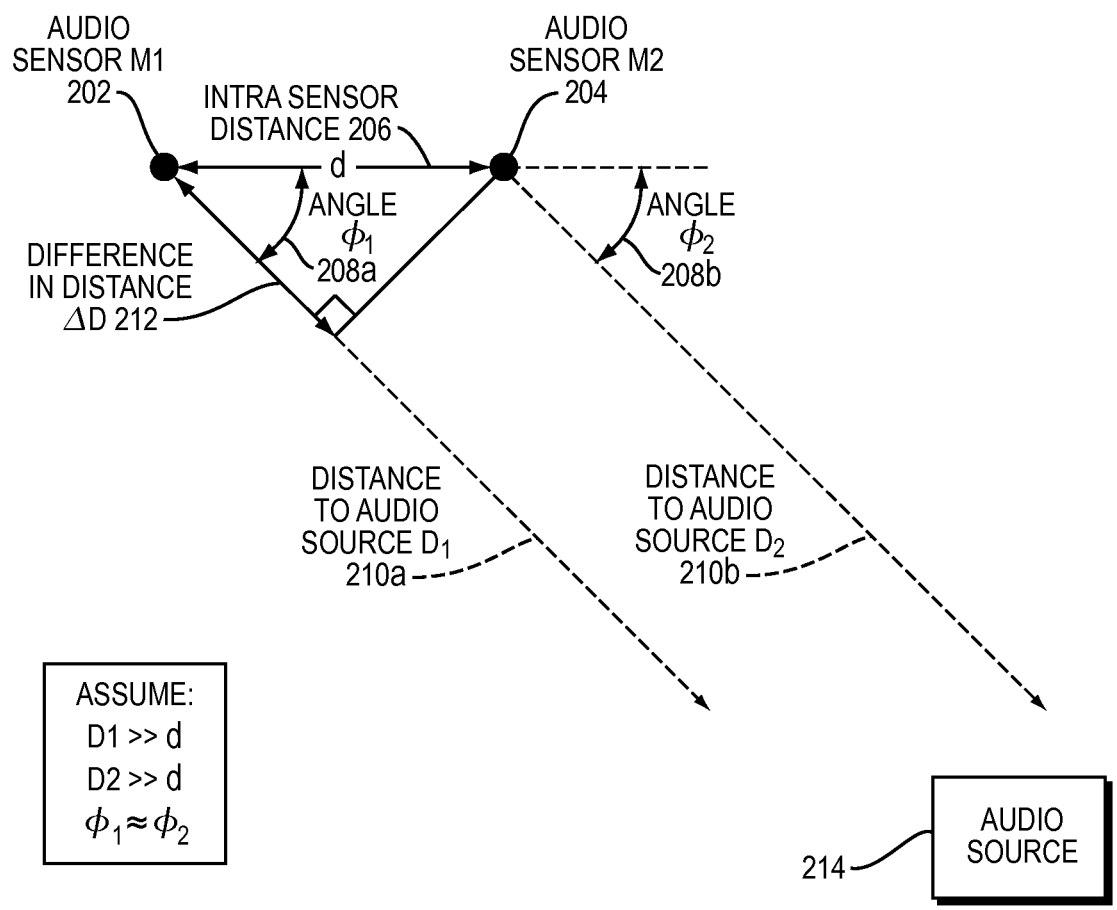
FIG. 2 is a diagram illustrating an embodiment employing audio sensors, an intra-sensor distance, and an audio source located away from the audio sensors by a distance to audio source, respectively.

FIG. 2 is a diagram 200 illustrating an embodiment employing audio sensors 202 ($M_1$) and 204 ($M_2$), an intra-sensor distance d (206), and an audio source 214 located away from $M_1$ and $M_2$ with distance to audio source 210a ($D_1$) and 210b ($D_2$), respectively. The difference in distance 212 ($\Delta D$) between $D_1$ and $D_2$ can be computed by performing correlation (e.g., correlation or autocorrelation) on the audio signals received from the audio sensors 202 and 204 ($M_1$ and $M_2$). Both $D_1$ and $D_2$ are at least an order of magnitude larger than d (e.g., $D_1 \gg d$ and $D_2 \gg d$). Under this assumption, the line from the audio source 214 to audio sensor 202 ($M_1$) and the line from the audio source 214 to audio sensor 204 ($M_2$) are approximately parallel. Therefore, angle $\Phi_1$ 208a is approximately congruent to angle $\Phi_2$ 208b, or $\phi_1 \approx \phi_2$, which can be both be represented by a common symbol $\varphi$ because the two angles are equal. The angle, $\varphi$, can be computed by the formulae as follows:

$$\cos(\phi) \approx \frac{\Delta D}{d} = \frac{|D_1 - D_2|}{d}$$

$$\phi = \cos^{-1}\left(\frac{|D_1 - D_2|}{d}\right)$$

Figure 3:
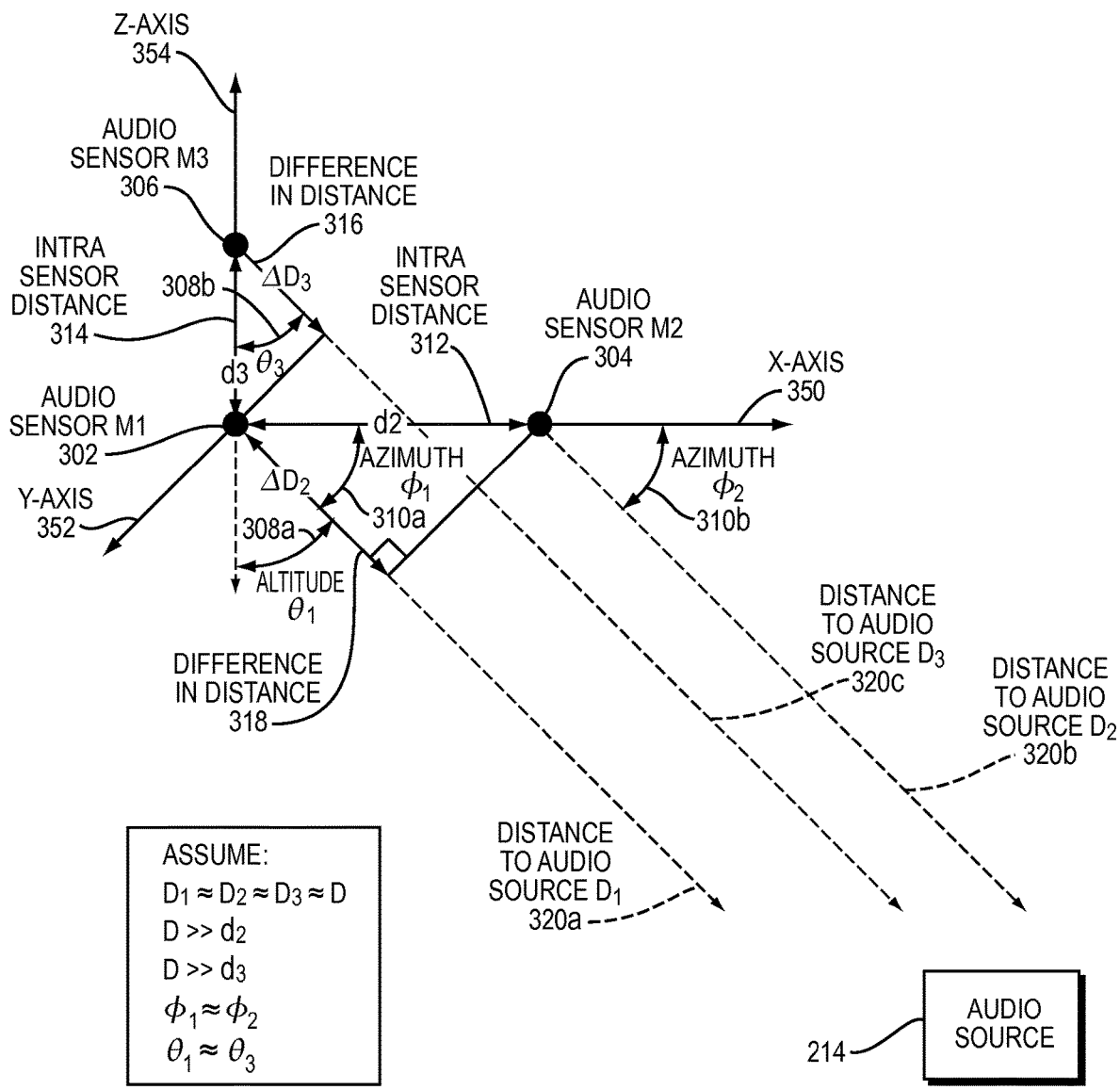
FIG. 3 is a diagram illustrating employing three audio sensors to find the location of the audio source.

FIG. 3 is a diagram illustrating employing three audio sensors 302 ($M_1$), 304 ($M_2$), and 306 ($M_3$) to find the location of the audio source 214. Audio sensors 302 ($M_1$) and 304 ($M_2$) are positioned along an X-axis 350 and audio sensors 302 ($M_1$) and 306 ($M_3$) are on the Z-axis 354. A distance to audio source 320a ($D_1$) represents the distance from the audio source 214 to audio sensor 302 ($M_1$). A distance to audio source 320b ($D_2$) represents distance from audio source 214 to audio sensor 304 ($M_2$). A distance to audio source 320a ($D_3$) represents distance from the audio source 214 to audio sensor 306 ($M_3$). Intra sensor distance 312 ($d_2$) represents the distance between audio sensor 302 ($M_1$) and audio sensor 304 ($M_2$). Intra-sensor distance 314 ($d_3$) represents distance between audio sensor 302 ($M_1$) and audio sensor 304 ($M_3$).

Distances to audio source 320a, 320b, and 320c ($D_1$, $D_2$, and $D_3$, respectively) are approximately congruent (e.g., $D_1 \approx D_2 \approx D_3$) and are each represented collectively by D, such that D is at least an order of magnitude greater than $d_2$ and $d_3$ (e.g., $D \gg d_2$, and $D \gg d_3$). Azimuth 310a ($\phi_1$), is approximately congruent to azimuth 310b ($\phi_2$) (e.g., $\phi_1 \approx \phi_2$) and both azimuths 310a-b are represented collectively by $\varphi$. Elevation angle 308a ($\theta_1$) is approximately congruent to elevation angle 308b ($\theta_2$) (e.g., $\theta_1 \approx \theta_2$) and are represented collectively by $\theta$. The three lines from audio source 214 to audio sensors 302, 304, and 306 ($M_1$, $M_2$, and $M_3$, respectively) are approximately parallel.

Azimuth (e.g., pan or horizontal) angles 310a-b and elevation (e.g., tilt or vertical) angle 308a-b are represented by the symbols $\varphi$ and $\Theta$, respectively. Azimuth and altitude can be computed by using similar formulae. The formulae are as follows:

$$\cos(\phi) \approx \frac{\Delta D_2}{d_2} = \frac{|D_1 - D_2|}{d_2}$$

$$\phi = \cos^{-1}\left(\frac{|D_1 - D_2|}{d_2}\right)$$

$$\cos(\theta) \approx \frac{\Delta D_3}{d_3} = \frac{|D_1 - D_3|}{d_3}$$

$$\theta = \cos^{-1}\left(\frac{|D_1 - D_3|}{d_3}\right)$$

$\varphi$ and $\Theta$ correspond to the pan and tilt angles of the PTZ camera, respectively.

Figure 4:
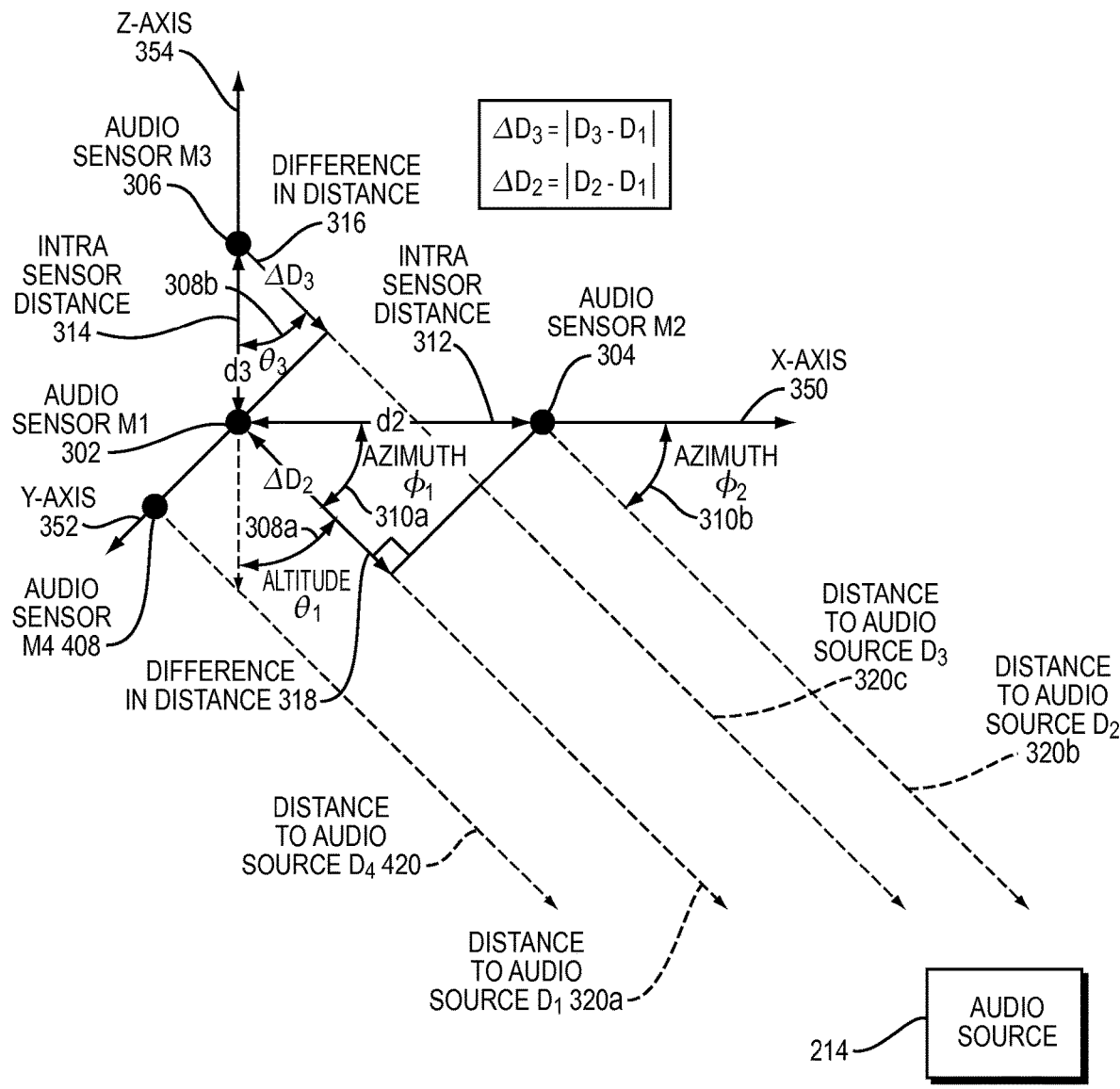
FIG. 4 is a block diagram illustrating an example embodiment of four audio sensors employed to determine the location of an audio source.

FIG. 4 is a block diagram 400 illustrating an example embodiment of four audio sensors 304, 306, 302, and 408 employed to determine the location of an audio source 214. The system employed in FIG. 4 is similar to the system of FIG. 3, except for the employment of the audio sensor 408 (M4), located a distance to audio source 420 (D4). Audio sensor 408 is employed to determine the precise location of the audio source 214. Without the fourth audio sensor 408, the location of the audio source 214 is known to be one of two locations. The fourth audio sensor 408 narrows the location down to one particular location.

Figure 5:
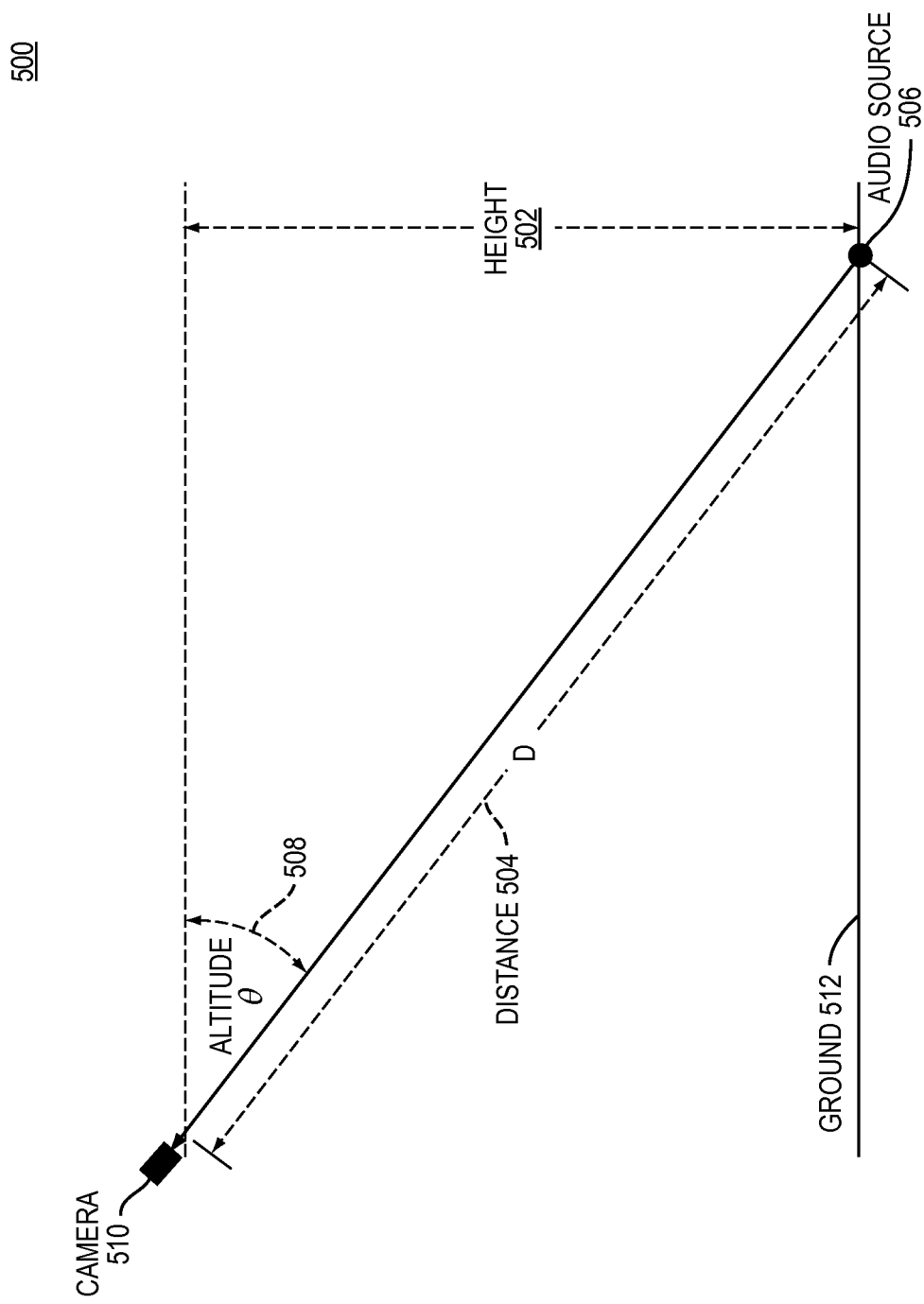
FIG. 5 is a block diagram illustrating a camera and an audio source.

FIG. 5 is a block diagram 500 illustrating a camera 510 and an audio source 506. The camera and sensors can be installed on top of a pole or on top of a building. The camera can be facing down to the ground, a common location of audio sources. H represents a height of the camera relative to the ground. The camera is angled toward a ground 512 at an elevation angle 508 $\theta$. The formulae to compute a distance 504 (D) from camera to the audio source are as follows:

$$\sin(\theta) = \frac{H}{D}$$

$$D = \frac{H}{\sin(\theta)}$$

The system can also perform zoom adjustment. If the targeted object is an individual and the individual stands a distance from the camera such that zoom is needed to see the individual clearly, the system can zoom the camera to focus on the individual.

$\Theta_0$ represents the tilt angle of the camera when the camera centers on the person. $Z_0$ represents zooming factor of the camera needed to see the person clearly. $D_0$ represents a distance from the camera to the person.

In actual detection and tracking, the pan angle ($\varphi$), tilt angle ($\Theta$) and distance (D) from the camera to the audio source can be computed by using the equations described above. The zooming factor (Z) can be computed by the either of the following formulae:

$$\frac{Z}{Z_0} = \frac{D}{D_0} = \frac{\sin(\theta_0)}{\sin(\theta_0)}$$

or $$Z = Z_0 \cdot \frac{\sin(\theta_0)}{\sin(\theta)}$$

The zooming factor controls the pan-tilt-zoom camera such that the size of the object seen in the image stays constant. $Z_0$, $D_0$, and $\theta_0$ are determined in a calibration stage. $Z_0$ represents a zooming factor of an object at distance $D_0$ and with a tilt angle $\theta_0$. For instance, during the calibration stage, the system computes the tilt angle $\theta_0$ of a person standing at a known location away from the camera with a known distance $D_0$ and using the height of the camera (H) and $D_0$ according to the following formula:

$$\sin(\theta_0) = \frac{H}{\sqrt{H^2 + D_0^2}}$$

The system adjusts the camera to center at the person and adjusts the zooming factor to a number, $Z_0$, which is a zooming factor where the person fills the image. These are used as the calibration variables for the system.

Three audio sensors can isolate the correct audio source location to two possibilities but cannot eliminate one of the two possible audio source locations. Four audio sensors can identify the one location. Assuming the three audio sensors are on the X and Z axes, the following analysis applies to determining the location with three audio sensors; however, the three audio sensors can be on any combination of axes and similar analyses can apply. From FIG. 3, if $(D_3-D_1)>0$ (or $D_3>D_1$), then the audio source is located below the X-Y plane (e.g., z<0), and otherwise is located above the X-Y plane (z>0). If $(D_2-D_1)>0$ (or $D_2>D_1$), then the audio source is located at the left side of Y-Z plane (x<0), and otherwise is located on the right side of Y-Z plane (x>0). The audio source can be narrowed to two possible solutions by employing three audio sensors: either y>0 or y<0. A fourth audio sensor positioned on the Y-axis can resolve whether y>0 or y<0. The result out of these four sensors is the direction of audio source in relation to the sensors. An arrangement of the sensors on different axes can change the direction of the uncertainty of the audio sources position, but the problem remains the same, and a fourth sensor is needed to resolve the position of the audio source with no ambiguity. Further, if an arrangement of three or more sensors is installed on each camera, and if two cameras include the arrangement of sensors, then the physical location of the audio source can be identified.

Figure 6:
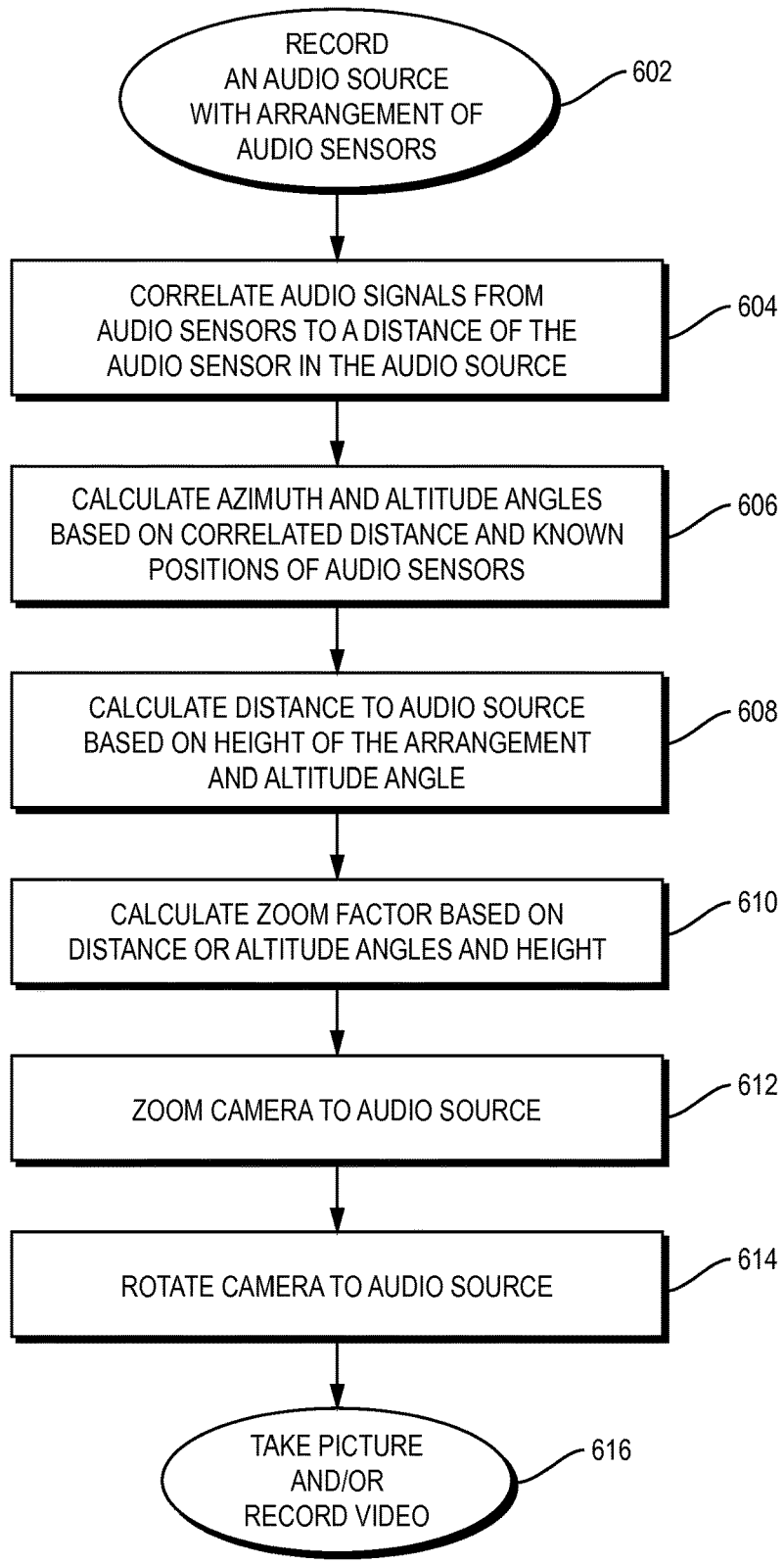
FIG. 6 is a block diagram illustrating an example embodiment of a process employed by the present invention.

FIG. 6 is a block diagram 600 illustrating an example embodiment of a process employed by the present invention. The process first records an audio source using an arrangement of audio sensors (602). Then, the process correlates audio signals from audio sensors to a distance of the audio sensor from the audio source (604). In one embodiment, the correlation can be autocorrelation. The process can further correlate all of the audio signals from the audio sensors with all of the other signals to determine the distance from each sensor. The process then calculates an azimuth (pan) and altitude (tilt) angles based on correlated distance and known positions of the audio sensors (606). The positions of the audio sensors are known relative to each other and also known relative to their positions in the real world, for example, being on top of a building indicating the height of the audio sensors.

Then, the system calculates distance to the audio source based on a height of the arrangements of sensors and an altitude angle (608). Then, the system calculates the zoom factor based on distance or altitude angle, and height (610). Then, the system zooms the camera to the audio source (612). The system then rotates the camera to the audio source (614). The system then takes a picture and/or records video using the camera correctly oriented at the audio source.

Embodiments or aspects of the present invention may be implemented in the form of hardware, software, or firmware. If implemented in software, the software may be any form of software capable of performing operations consistent with the example embodiments disclosed herein. The software may be stored in any non-transient computer readable medium, such as RAM, ROM, magnetic disk, or optical disk. When loaded and executed by processor(s), the processor(s) are configured to perform operations consistent with the example embodiments disclosed herein. The processor(s) may be any form of processor(s) capable of being configured to execute operations as disclosed herein.

While this invention has been particularly shown and described with references to example embodiments thereof, it will be understood by those skilled in the art that various changes in form and details may be made therein without departing from the scope of the invention encompassed by the appended claims.

What is claimed is:

1. A system comprising:
    an arrangement of four audio sensors including a central audio sensor and three surrounding audio sensors configured to produce independent outputs, each of the three surrounding audio sensors positioned at known locations on an x-, y-, and z-axis respective to an origin located at the central audio sensor, at least three sensors of the arrangement of four audio sensors are mounted directly on at least three respective sides of a camera, the camera including a motor configured to adjust the camera and the at least three sensors so that they move together along both an azimuth adjustment and an elevation adjustment in response to signals from a processor originated by the arrangement of four audio sensors;
    the processor; and
    a memory with computer code instructions stored therein, the memory operatively coupled to said processor such that the computer code instructions configure the processor to implement determining an elevation angle and an azimuth angle of an audio source relative to the known locations of the arrangement of the four audio sensors where the elevation angle is based on an elevation angle $\theta$ based on the relationship:

$$\theta = \cos^{-1}(|D_1 - D_3|/d_3),$$

where $D_1-D_3$ is a difference in distance from the central audio sensor to the audio source and distance from a first of the surrounding sensors to the audio source, and $d_3$ is a distance from the central audio sensor to the first surrounding sensor, and the azimuth angle is further based on an azimuth angle $\Phi$ based on the relationship $$\Phi=\cos^{-1}(|D_1-D_2|/d_2),$$

where $D_1-D_2$ is a difference in distance from the central audio sensor to the audio source and distance from a second of the surrounding sensors to the audio source, and $d_2$ is a distance from the central audio sensor to the second surrounding sensor;

the computer code instructions causing the processor to correlate audio signals from the four audio sensors to a distance of each audio sensor from the audio source;

the computer code instructions further causing the processor to calculate elevation and azimuth angles based on correlated distance and known positions of the four audio sensors;

the computer code instructions further causing the processor to adjust at least one of pan or tilt of the camera and the at least three sensors located on the camera, in response to the calculated elevation and azimuth angles;

the computer code instructions further causing the processor to implement determining a distance of the audio source relative to the known locations of the arrangement of the four audio sensors based on the relationship $D=H/\sin(\theta)$, where D is the distance of the audio source relative to the known locations of the audio sensors, and H is a height of the arrangement relative to a ground level; and the computer code instructions further causing the processor to adjust zoom of the camera, in response to the determined distance of the audio source.

2. The system of claim 1, wherein the processor is further configured to orient a camera lens of a camera system to the audio source, the camera system operationally coupled to the processing module.

3. The system of claim 2, wherein the processor is further configured to instruct the camera system to cause the camera lens to adjust its zoom to a zoom factor as a function of the distance of the audio source.

4. The system of claim 1, wherein the processor is further configured to tilt the camera based on the azimuth angle, wherein the elevation angle can be positive, neutral, or negative.

5. The system of claim 1, wherein distances between the audio sensors of the arrangement are at least one order of magnitude smaller than the distance of the arrangement of audio sensors to the audio source.

6. The system of claim 1, wherein the independent outputs of the four audio sources are audio signals; and wherein the arrangement of at least four audio sources is configured to produce a combined output of the distance of the audio source to the arrangement by correlating the audio signals received at the at least four audio sources.

7. A method comprising:

producing independent outputs from audio sensors from an arrangement of four audio sensors having a central audio sensor and three surrounding audio sensors, wherein the three surrounding audio sensors are positioned at known locations on an x-, y-, and z-axis respective to an origin located at the central audio sensor, at least three sensors of the arrangement of four audio sensors are mounted directly on at least three respective sides of a camera, the camera including a motor configured to adjust the camera and the at least three sensors so that they move together both an azimuth adjustment and an elevation adjustment in response to signals from a processor originated by the arrangement of the four audio sensors;

determining, by the processor, from the independent outputs of the audio sensors, an elevation angle and an azimuth angle of an audio source relative to the known locations of the arrangement of the four audio sensors, where the elevation angle is based on an elevation angle $\theta$ based on the relationship:

$$\theta=\cos^{-1}(|D_1-D_3|/d_3),$$

where $D_1-D_3$ is a difference in distance from the central audio sensor to the audio source and distance from a first of the surrounding sensors to the audio source, and $d_3$ is a distance from the central audio sensor to the first surrounding sensor, and the azimuth angle is further based on an azimuth angle $\Phi$ based on the relationship $$\Phi=\cos^{-1}(|D_1-D_2|/d_2),$$

where $D_1-D_2$ is a difference in distance from the central audio sensor to the audio source and distance from a second of the surrounding sensors to the audio source, and $d_2$ is a distance from the central audio sensor to the second surrounding sensor;

wherein the determining includes correlating, by the processor, the audio signals from the four audio sensors to a distance of each audio sensor from the audio source;

calculating, by the processor, elevation and azimuth angles based on correlated distance and known positions of the four audio sensors;

adjusting, by the processor, at least one of pan or tilt of the camera and the at least three sensors located on the camera, in response to the calculated elevation and azimuth angles;

determining, by the processor, a distance of the audio source relative to the known locations of the arrangement of the four audio sensors based on the relationship $D=H/\sin(\theta)$, where D is the distance of the audio source relative to the known locations of the audio sensors, and H is a height of the arrangement relative to a ground level; and adjusting, by the processor, zoom of the camera, in response to the determined distance of the audio source.

8. The method of claim 7, further comprising orienting a camera lens of a camera system to the audio source.

9. The method of claim 8, further comprising instructing the camera system to cause the camera lens to adjust its zoom to a zoom factor as a function of the distance of the audio source.

10. The method of claim 7, further comprising:
tilting the camera based on the azimuth angle, wherein the elevation angle can be positive, neutral, or negative.

11. The method of claim 7, wherein distances between the audio sensors of the arrangement are at least one order of magnitude smaller than the distance of the arrangement of audio sensors to the audio source.

12. The method of claim 7, wherein producing the independent outputs of the four audio sources includes producing audio signals; and further comprising producing a combined output of the distance of the audio source to the arrangement by correlating the audio signals received at the at least four audio sources.

13. A non-transitory computer-readable medium configured to store instructions for locating an audio source, the instructions, when loaded and executed by a processor, causes a system coupled to the processor to:

receive independent outputs from an arrangement of four audio sensors, having a central audio sensor and three surrounding audio sensors, wherein the three surrounding audio sensors are positioned at known locations on an x-, y-, and z-axis respective to an origin located at the central audio sensor, at least three sensors of the arrangement of four audio sensors are mounted directly on at least three respective sides of a camera, the camera including a motor configured to adjust the camera and the at least three sensors so that they move together along both an azimuth adjustment and an elevation adjustment in response to signals from the processor originated by the arrangement of four audio sensors;

determine an angle of an audio source relative to the known locations of the arrangement of the four audio sensors, where the angle is based on an elevation angle $\theta$ based on the relationship:

$$\theta=\cos^{-1}(|D_1-D_3|/d_3),$$

where $D_1-D_3$ is a difference in distance from the central audio sensor to the audio source and distance from a first of the surrounding sensors to the audio source, and $d_3$ is a distance from the central audio sensor to the first surrounding sensor, and the azimuth angle is further based on an azimuth angle $\Phi$ based on the relationship $$\Phi=\cos^{-1}(|D_1-D_2|/d_2),$$

where $D_1-D_2$ is a difference in distance from the central audio sensor to the audio source and distance from a second of the surrounding sensors to the audio source, and $d_2$ is a distance from the central audio sensor to the second surrounding sensor;

correlate the audio signals from the four audio sensors to a distance of each audio sensor from the audio source;

calculate elevation and azimuth angles based on correlated distance and known positions of the four audio sensors;

adjust at least one of pan or tilt of the camera and the at least three sensors located on the camera, in response to the calculated elevation and azimuth angles;

determine distance of the audio source relative to the known locations of the arrangement of the four audio sensors based on the relationship $D=H/\sin(\theta)$, where $D$ is the distance of the audio source relative to the known locations of the audio sensors, and $H$ is a height of the arrangement relative to a ground level; and adjust zoom of the camera, in response to the determined distance of the audio source.

14. The non-transitory computer-readable medium of claim 13, wherein the instructions further cause the system coupled to the processor to orient a camera lens of a camera system to the audio source.

15. The non-transitory computer-readable medium of claim 14, wherein the instructions further cause the system coupled to the processor to instruct the camera system to cause the camera lens to adjust its zoom to a zoom factor proportional to the distance of the audio source.

16. The non-transitory computer-readable medium of claim 13, wherein the instructions further cause the system coupled to the processor to calculate an azimuth angle from the audio source to the arrangement and an elevation angle from the audio source to the arrangement and tilt the camera based on the azimuth angle, wherein the elevation angle can be positive, neutral, or negative.

17. The non-transitory computer-readable medium of claim 13, wherein distances between the audio sensors of the arrangement are at least one order of magnitude smaller than the distance of the arrangement of audio sensors to the audio source.

18. The non-transitory computer-readable medium of claim 13, wherein producing the independent outputs of the at least four audio sources includes producing audio signals; and wherein the instructions further cause the processor to produce a combined output of the distance of the audio source to the arrangement by correlating the audio signals received at the at least four audio sources.

19. The system of claim 1, wherein the arrangement includes at most four audio sensors.

20. The method of claim 7, wherein the arrangement includes at most four audio sensors.

21. The non-transitory computer readable medium of claim 13, wherein the arrangement includes at most four audio sensors.

* * * * *